United States Patent [19]
Liau

[11] Patent Number: 6,109,127
[45] Date of Patent: Aug. 29, 2000

[54] POWER TRANSMISSION SYSTEM EMPLOYING A MOTOR AND AN ENGINE

[75] Inventor: Bai Guang Liau, No. 120, Nan-Tzu Road, Nan-Tzu Villiage, Erh-Lun Hsiang, Yun-Lin Hsien, Taiwan

[73] Assignees: Bai Guang Liau; Boahsin Industrial Co., Ltd., both of Taichung, Taiwan; a part interest

[21] Appl. No.: 09/280,740

[22] Filed: Mar. 29, 1999

[51] Int. Cl.$^7$ .............................. B60K 6/02; F16H 59/40; F16H 55/56

[52] U.S. Cl. ........................ 74/336 B; 74/661; 74/665 B; 74/665 D; 180/65.2; 180/65.6; 180/69.6; 180/220; 474/15; 474/33

[58] Field of Search .................................. 74/336 B, 661, 74/665 B, 665 D; 180/65.2, 65.6, 69.6, 220; 474/15, 32, 33

[56] References Cited

U.S. PATENT DOCUMENTS

| | | | |
|---|---|---|---|
| 5,193,634 | 3/1993 | Masut ...................................... | 180/65.2 |
| 5,755,303 | 5/1998 | Yamamoto et al. .................... | 180/65.2 |
| 6,020,697 | 2/2000 | Shimasaki et al. ................ | 180/65.3 X |

*Primary Examiner*—Allan D. Herrmann
*Attorney, Agent, or Firm*—Charles E. Baxley, Esq.

[57] ABSTRACT

A power transmission system includes a motor connected to a variable pulley device via a uni-directional device and an engine connected to a clutch device via a uni-directional device. A pulley device is disengagably connected to the clutch device and connected to the variable pulley device by a belt. A pulley device is connected to the variable pulley device by another belt and the pulley device is connected to a gear box. The variable pulley device includes two disks and a threaded axle connected therebetween. A movable member having two inclined surfaces is movably mounted to the threaded axle so that the two belts are separated by the movable member.

3 Claims, 11 Drawing Sheets

POWER TRANSMISSION SYSTEM EMPLOYING A MOTOR AND AN ENGINE

FIELD OF THE INVENTION

The present invention relates to a power transmission system used in a vehicle or a motorbike, and more particularly, to a power transmission system shifting the output power between a motor and an engine so as to reach a best performance.

BACKGROUND OF THE INVENTION

Figure 1:
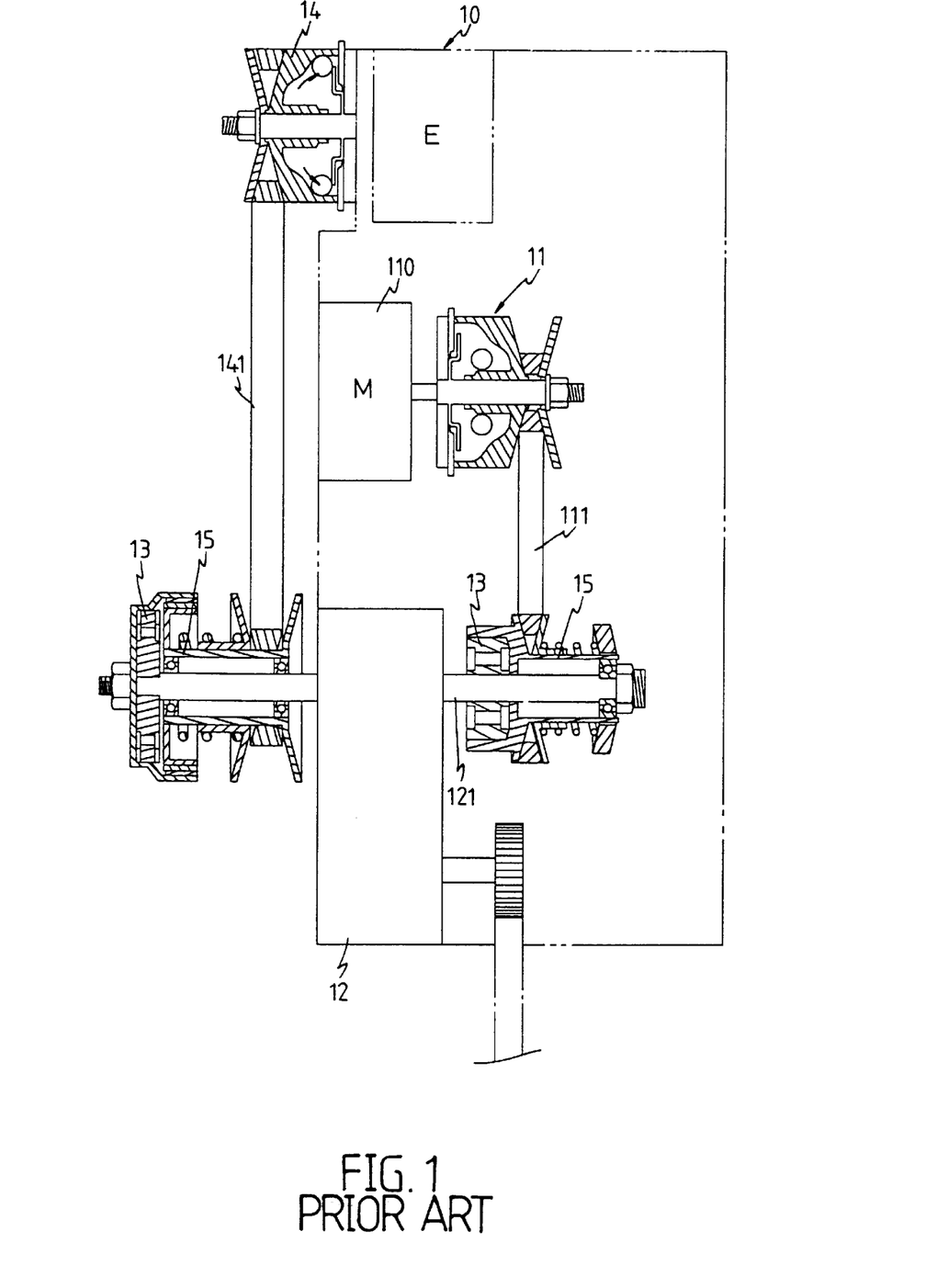
FIG. 1 shows a conventional power transmission system when the engine power is adopted to input in the gear box.
Figure 2:
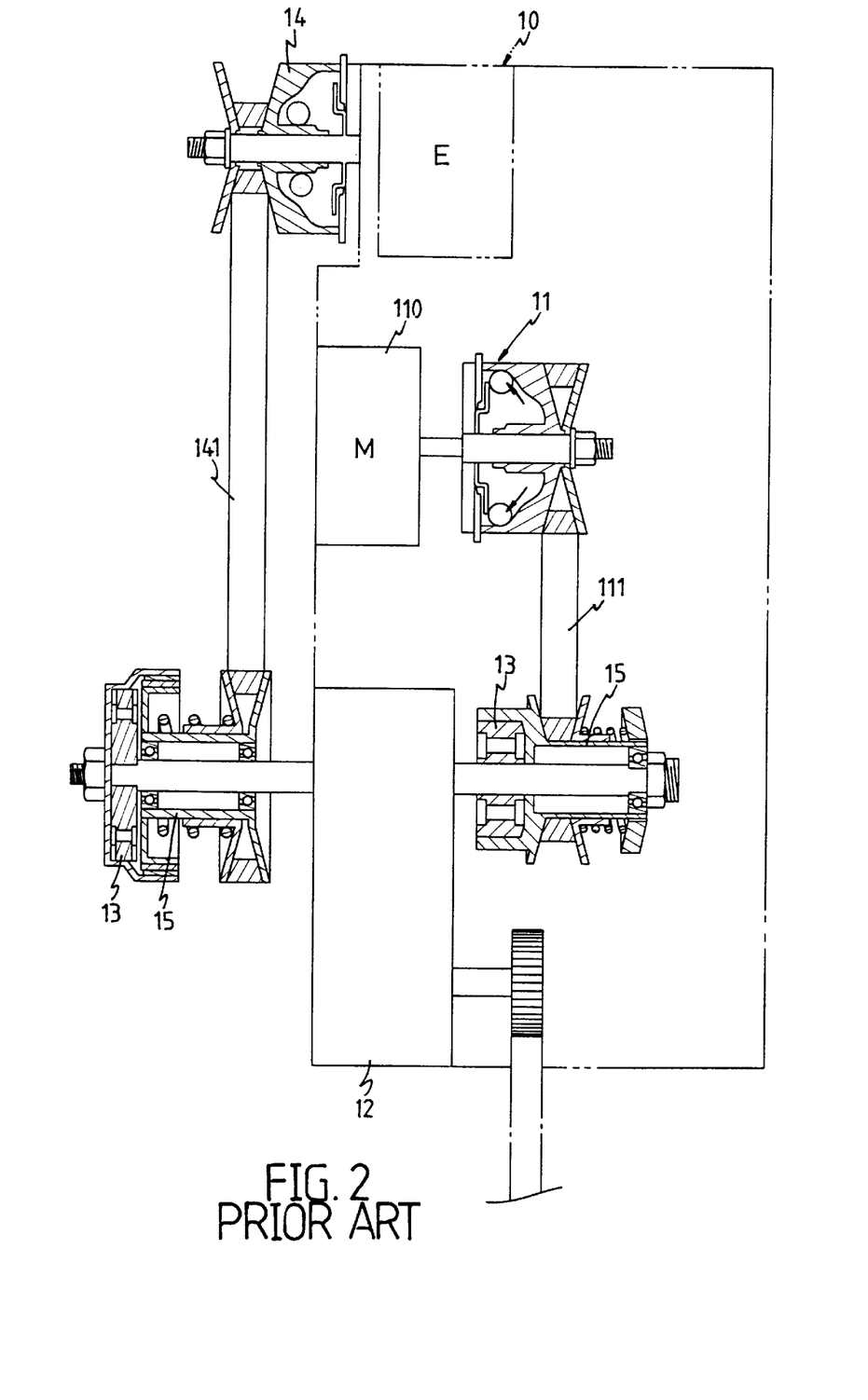
FIG. 2 shows a conventional power transmission system when the motor power is adopted to input in the gear box.

A conventional power transmission system employing a motor (110) and an engine (10) is shown in FIGS. 1 and 2 and comprises a first pulley means (11) connected to the motor (110) and a second pulley means (14) connected to the engine (14). A gear box (12) has a shaft (121) whose two ends are respectively connected to two third pulleys (15) which are respectively connected to the first pulley means (11) and the second pulley means (14) by two belts (111, 141). Each of the two third pulleys (15) has a uni-directional device (13) connected thereto. It is desired to employ the output power of the engine (10) or the output power of the motor (110) according to the situation such as a high torque required situation or a high speed required situation. Each of the pulley means (11, 14, 15) has a variable width for movably receiving the V-shaped belts (111, 141) to be engaged so as to generate different speed and torque. There have some inherent shortcomings which are:

1. The system involves the first pulley means (11) and the second pulley means (14) each of which comprises a plurality of balls which move within the casing of the respectively pulley means according to the speed of the pulley means they are involved, two general pulleys (15) and two belts (111, 141). The system therefore occupies a large space.
2. The system cannot provide enough torque in time when riding the vehicle or motorbike on a rugged road or snow-covered road. That is because the balls in the first pulley means (11) and the second pulley means (14) cannot move outward when the rotational speed is low so that the system cannot provide enough torque under a lower r.p.m. of the motor (110) or the engine (10).
3. The speed reduction ratio is so small that the conventional system cannot meet the needs of practical use.

The present invention intends to provide an improved power transmission system which timely shifts the output power of the motor or the engine and generates a large speed reduction ratio. The present invention has arisen to resolve the shortcomings of the conventional power transmission system.

SUMMARY OF THE INVENTION

In accordance with one aspect of the present invention, there is provided a power transmission system comprising an engine output device, a motor output device which is connected to the engine output device by a first belt, and a pulley means which is respectively connected to the motor output device by a second belt and the gear box. The engine output device comprises an engine connected to a first pulley means and a clutch means which is disengagably connected between the output shaft and the first pulley means. A uni-directional means has an outer ring connected to the output shaft and an inner ring connected to the clutch means.

The motor output device comprises a motor having an output shaft which is connected to an outer ring of another uni-directional means. A variable pulley means has an axle having a threaded section to which a movable member is movably mounted which has two inclined surfaces. Two disks are fixedly connected to the threaded section so that the first belt is located between the movable member and one of the disks, and the second belt is located between the movable member and the other disk. The inner ring of the uni-directional means is connected to the axle of the variable pulley means.

The gear shifting device comprises a second pulley means connected to an input shaft of a gear box which is then connected to a wheel. A first belt is connected between the first pulley means and the variable pulley means, and a second belt is connected between the second pulley means and the variable pulley means. The first belt and the second belt are separated by the movable member.

The main object of the present invention is to provide a power transmission system which adopts the engine power when the speed is low, the motor power when the speed is between 15–40 km/hr, and the engine power again when the speed is over 40 km/hr.

Another embodiment of the present invention is to provide a power transmission system which occupies a less space and involves less parts compared with the conventional power transmission system.

Further objects, advantages, and features of the present invention will become apparent from the following detailed description with appropriate reference to the accompanying drawings.

DETAILED DESCRIPTION OF THE PREFERRED EMBODIMENTS

Figure 3:
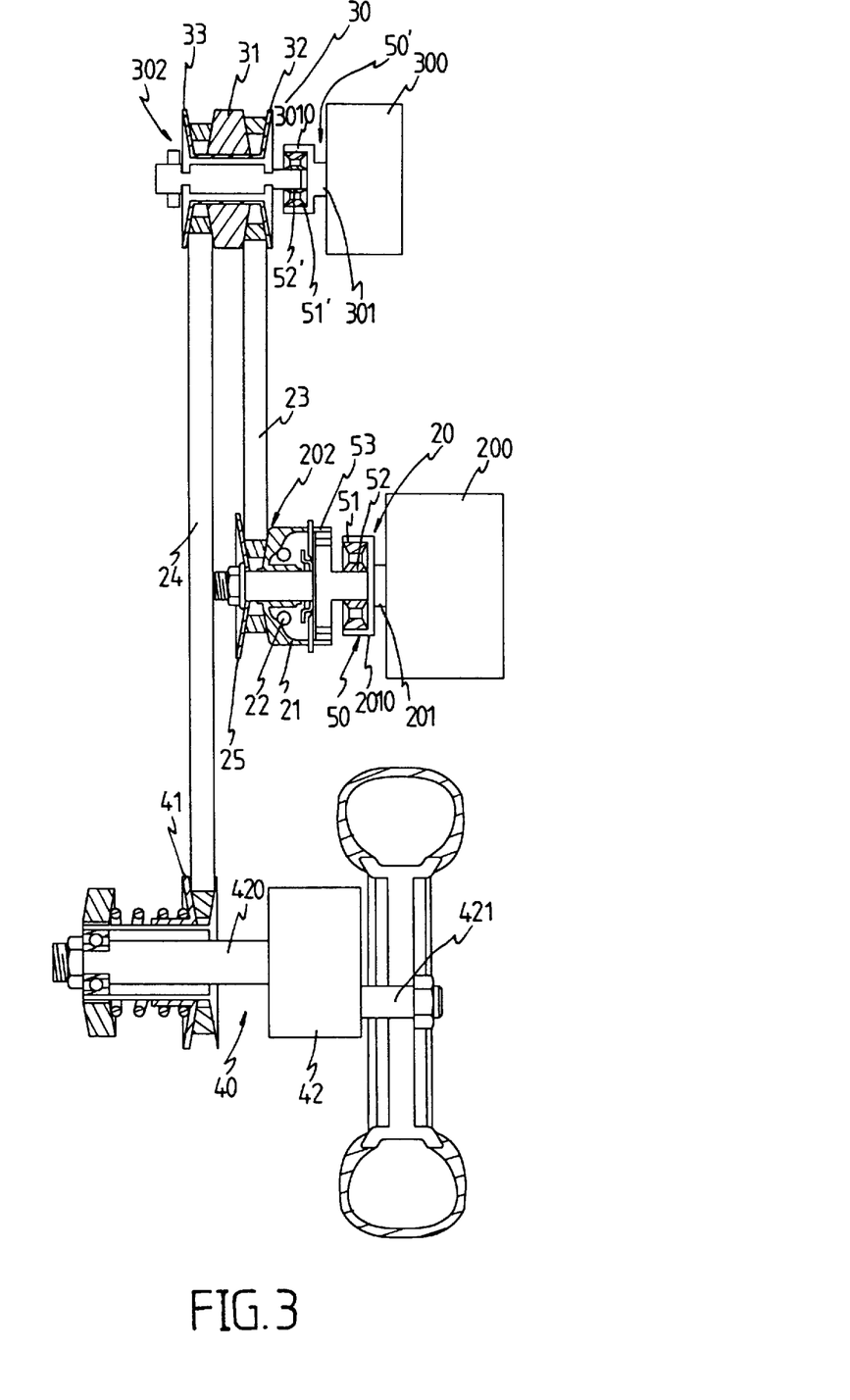
FIG. 3 shows a first embodiment of the power transmission system wherein the engine is started at the beginning.

Referring to FIG. 3, the power transmission system comprises an engine output device (20), a motor output device (30) and gear shifting device (40) wherein a first transmission member, such as a first belt (23) is connected between the engine output device (20) and the motor output device (30), and a second transmission member, such as a second belt (24) is connected between the motor output device (30) and the gear shifting device (40). The engine output device (20) comprises an engine (200) having an output shaft (201) extending therefrom and a frame (2010) is connected to the distal end of the output shaft (201). A uni-directional means (50) is received in the frame (2010) and has an outer ring (51) connected to the frame (2010) and an inner ring (52) connected to a clutch means (53). A first pulley means (202) is disengagably connected to the clutch means (53). The first pulley means (202) includes a fixed disk (25) and a variable portion (21) which has a plurality of balls (22) movably received therein so that when the engine is ignited to rotate the first pulley means (202), the balls (22) move outward due to the eccentric force to let the first belt (23) move radially outward between the fixed disk (25) and the variable portion (21) as shown in FIG. 3.

Figure 9:
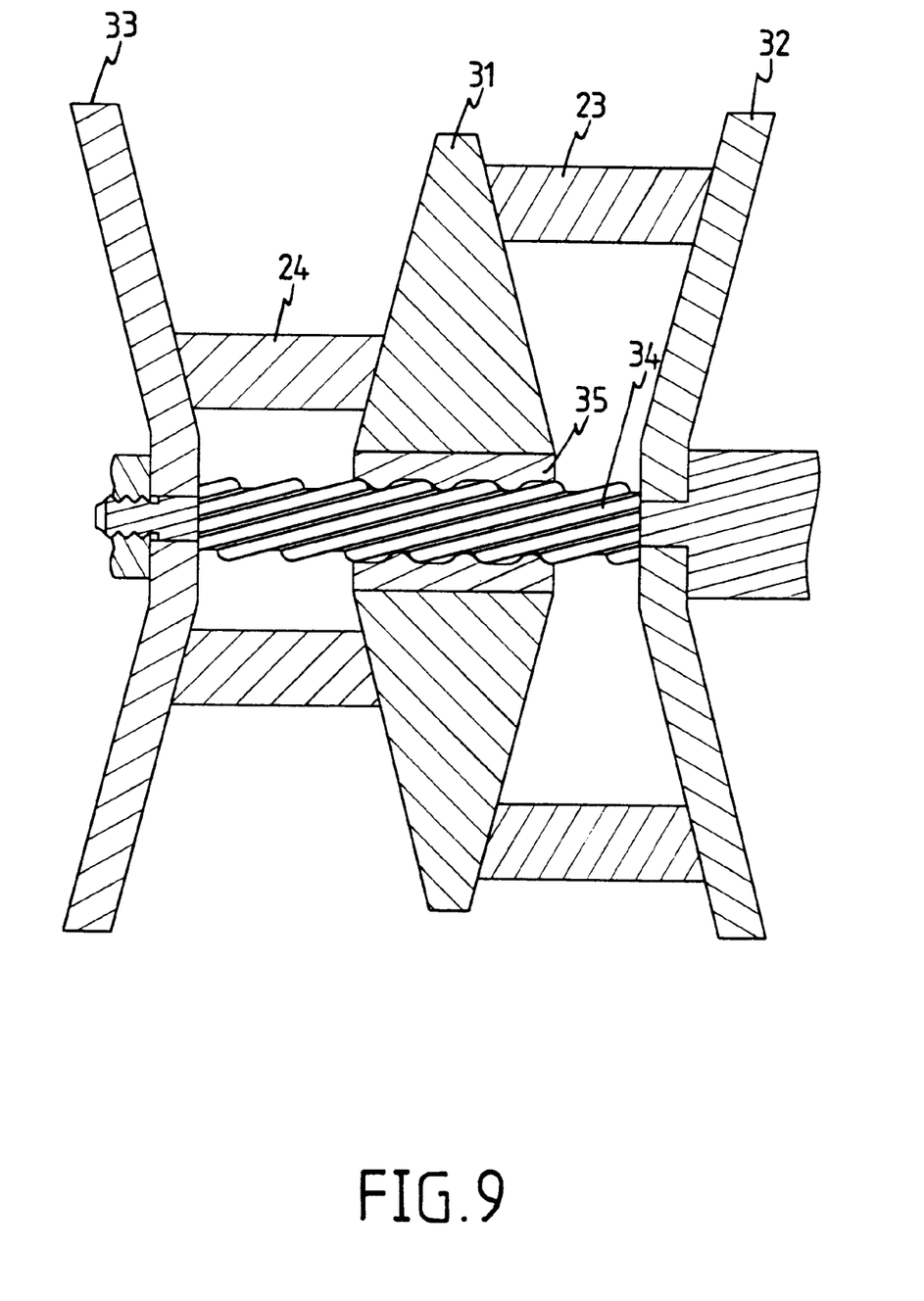
FIG. 9 is a side elevational view, partly in section, to show the structure of the variable pulley means.

The motor output device (30) comprises a motor (300) having an output shaft (301) extending therefrom with a frame (3010) connected to the distal end thereof so as to receive another uni-directional means (50') therein which has an outer ring (51') connected to the frame (3010) and an inner ring (52') connected to the axle of a variable pulley means (302). Referring to FIG. 9, the variable pulley means (302) comprises the axle which has a threaded section (34), a movable member (31) connected to a tube (35) movably mounts to the threaded section (34), the movable member (31) having two inclined surfaces. Two disks (32, 33) are fixedly connected to two ends of the threaded section (34) so that the movable member (31) is located between the two disks (32, 33). The first belts (23, 24) are respectively received between the movable member (31) and the two disks (32, 33).

The gear shifting device (40) comprises a second pulley means (41) for receiving the second belt (24) and a gear box (42) which has an input shaft (420) connected to the second pulley means (41) and an output shaft (421) connected to a wheel of the vehicle for example.

Figure 7:
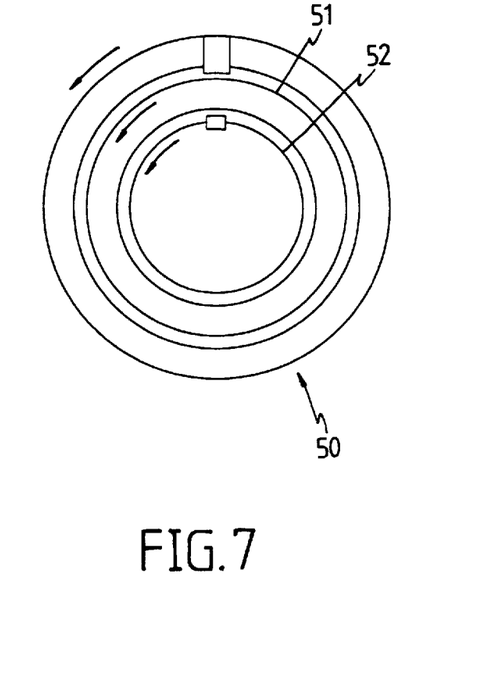
FIG. 7 shows an illustrative view to show uni-directional means when the outer ring has a higher speed than that of the inner ring which is co-rotated with the outer ring.
Figure 8:
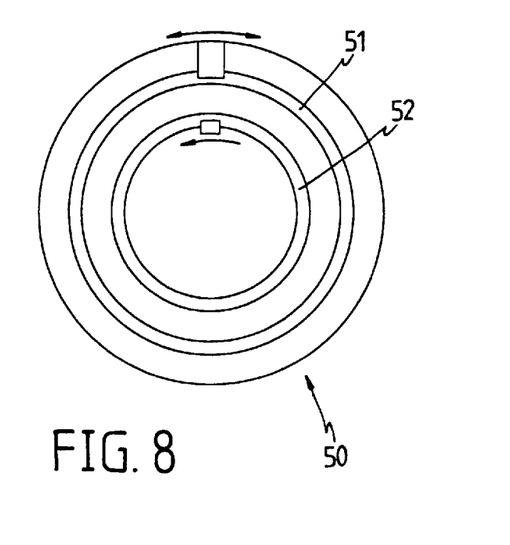
FIG. 8 shows an illustrative view to show uni-directional means when the outer ring has a lower speed than that of the inner ring which is not co-rotated with the outer ring.

When the vehicle starts to move as shown in FIG. 3, the engine (200) is ignited and the outer ring (51) connected to the frame (2010) has a higher speed than that of the inner ring (52) which is therefore rotated with the outer ring (51) (see FIG. 7) so as to rotate the first pulley means (202). The balls (22) move outward slightly due to the eccentric force so that the first belt (23) moves outward between the fixed disk (25) and the variable portion (21). In this situation, the first belt (23) has a small effective diameter relative to the first pulley means (202) because the speed of the vehicle or the motorbike is just moved and has the speed below 15 km/hr so that the first belt (23) slightly moves within the first pulley means (202). The first belt (23) in the variable pulley means (302) therefore has a large effective diameter corresponding to the first belt (23) in the first pulley means (202). The variable pulley means (302) rotates via the power transmitted from the first belt (23) to rotate the inner ring (52') of the uni-directional means (50'). Because the inner ring (52') has a higher speed than that of the outer ring (51') which is connected to the motor (300) so that the outer ring (51') will not co-rotate with the inner ring (52'). Therefore, the power of the engine (200) is transmitted to the second pulley means (41) to input into the gear box (42). It is to be noted that the effective diameter of the second belt (24) relative to the second pulley means (41) is large so that the rotational speed of the second pulley means (41) is at its lower level. That is to say, when the vehicle is moved at a low speed, a large enough torque is provided.

Figure 4:
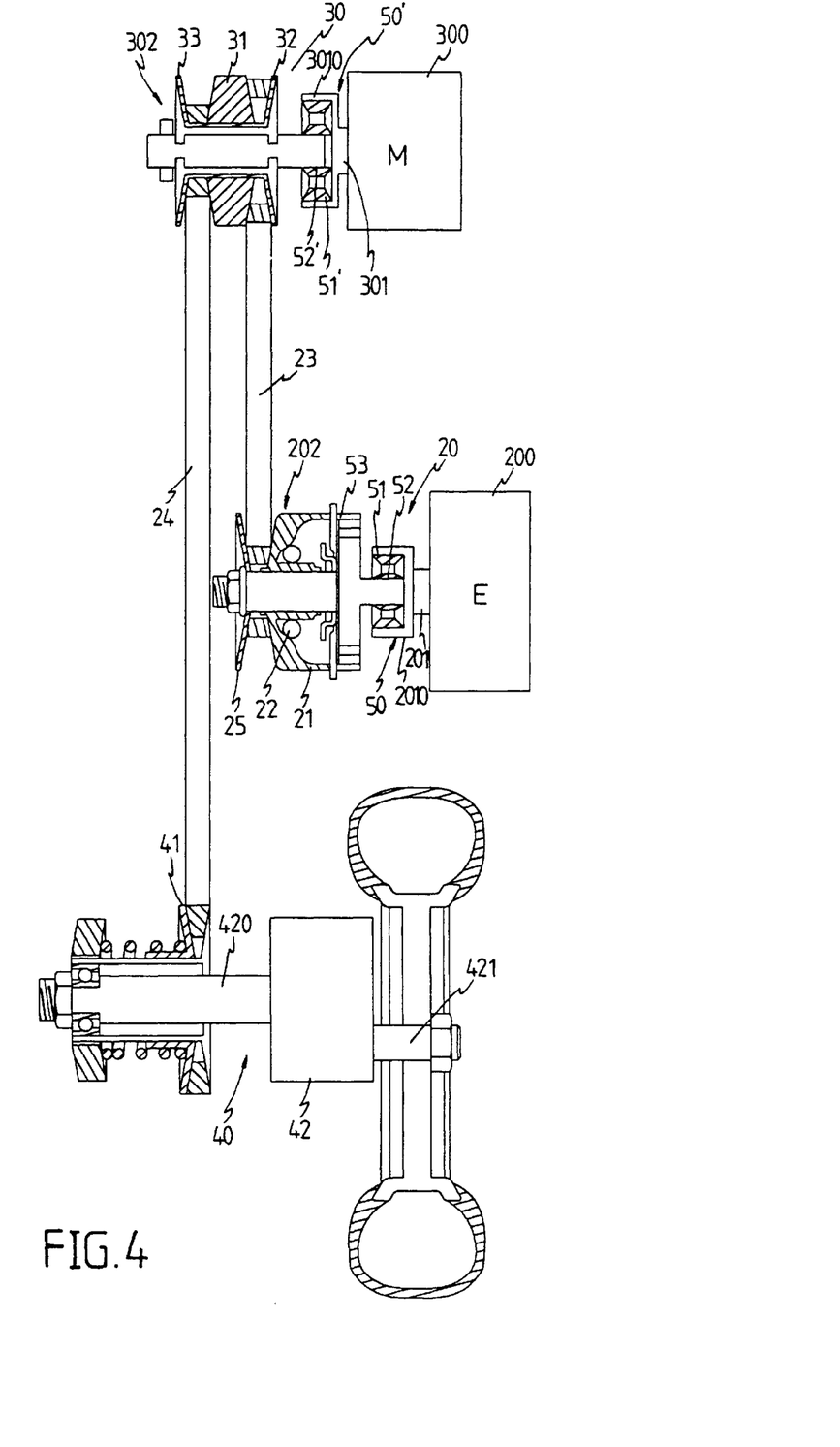
FIG. 4 shows when the speed of the vehicle or the motorbike equipped with the system is about 15 to 40 km/hr, the motor power is adopted.

Referring to FIG. 4, when the speed is raised to about 15 to 40 km/hr, the clutch (53) is disengaged from the first pulley means (202) and the speed of the motor (300) is raised so that the speed of the motor (300) is higher than that of the engine (200) so that the speed of the inner ring (52') is then lower than that of the outer ring (51') which is connected to the motor (300) so that the inner ring (52') is then co-rotated with the outer ring (51') and the power of the motor (300) is adopted. For the engine (200), because the inner ring (52) rotates at a higher speed (the same as the motor) than that of the outer ring (51) so that the inner ring (52) is rotated independently from the outer ring (51). The tension of the first belt (23) is smaller than that of the second belt (24) and the movable member (31) moves toward the first belt (23) so that the effective diameter of the second belt (24) relative to the variable pulley means (302) is reduced, the effective diameter of the second belt (24) relative to the second pulley means (41) is increase .

Figure 5:
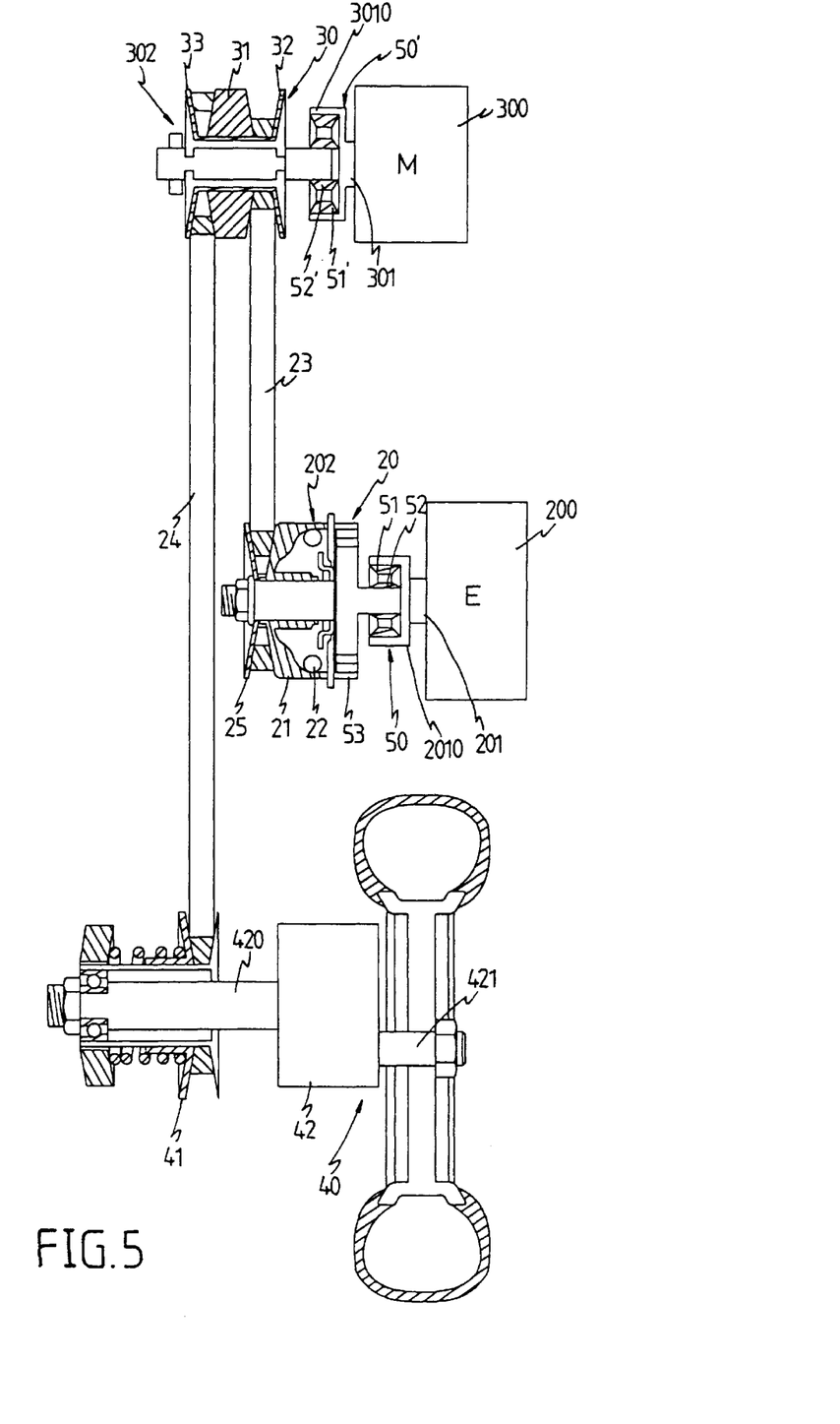
FIG. 5 shows the power transmission system when the speed of the vehicle or the motorbike is over 40 km/hr and the engine power is fully adopted.

Referring to FIG. 5, when the speed of the motor (300) reaches to a predetermined value, higher than 40 km/hr for example, the motor (300) is set to stop and the engine (200) raises its speed to let the outer ring (51) connected to the engine (200) be co-rotated with the inner ring (52). The balls (22) move outward to let first belt (23) in the first pulley means (202) to have a large effective diameter and to have a small effective diameter in the variable pulley means (302). The second belt (24) in the variable pulley means (302) has a large effective diameter and has a small effective diameter in the second pulley means (41) to output a high speed.

Accordingly, the engine power (200) is adopted at the situations when the vehicle speed is low and when the vehicle speed is higher than 40 km/hr. During the speed of 15–40 km/hr, the motor power (300) is adopted because it is economical to use the electric power of the motor (300).

Figure 6:
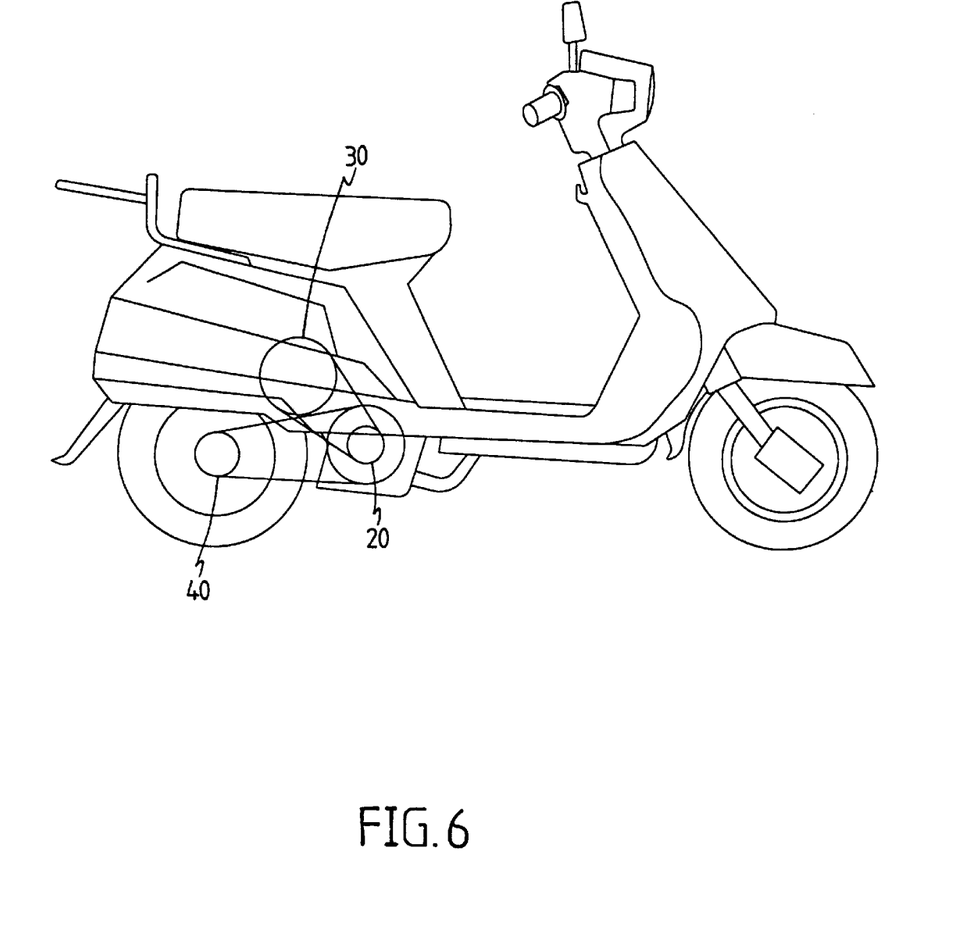
FIG. 6 is an illustrative view to show the power transmission system is used in a motorbike.

The power transmission system of the present invention can be used in a motorbike as shown in FIG. 6. The system allows the motorbike having a small engine to perform a better performance and effectively to reduce the air pollution caused by the exhausted air.

Figure 10:
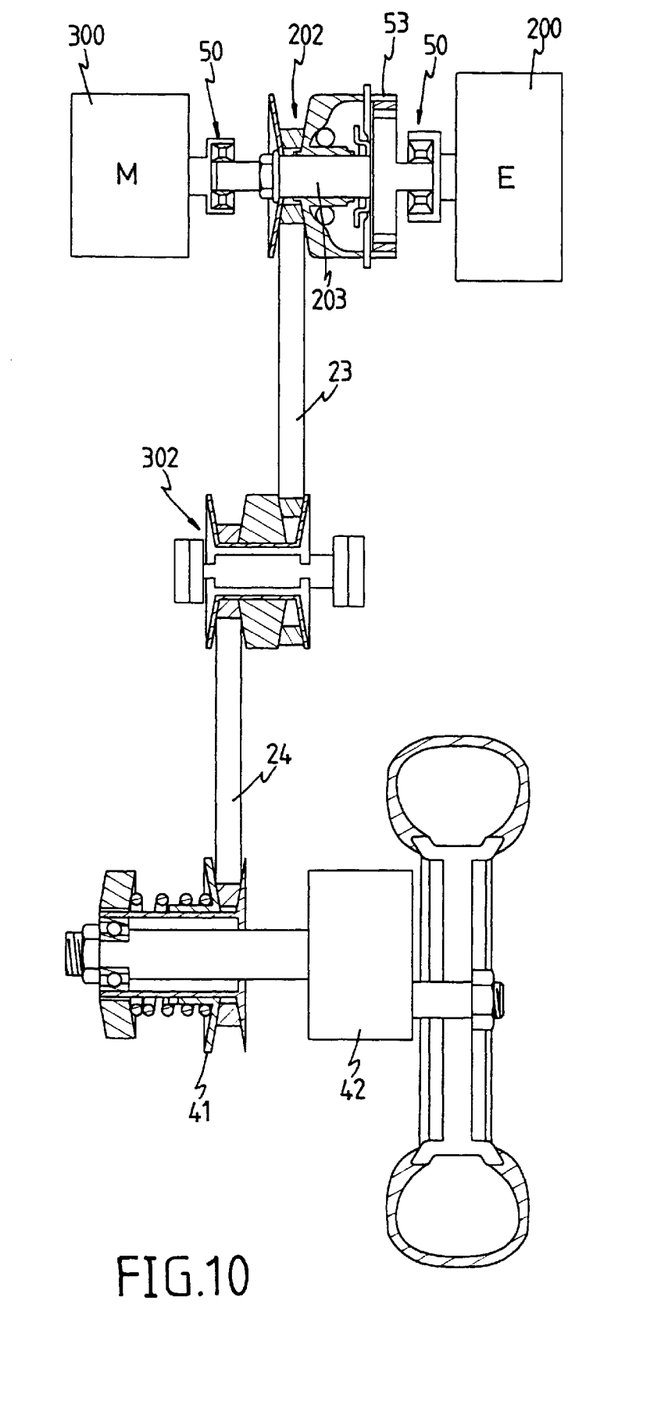
FIG. 10 shows another embodiment of the power transmission system.
Figure 11:
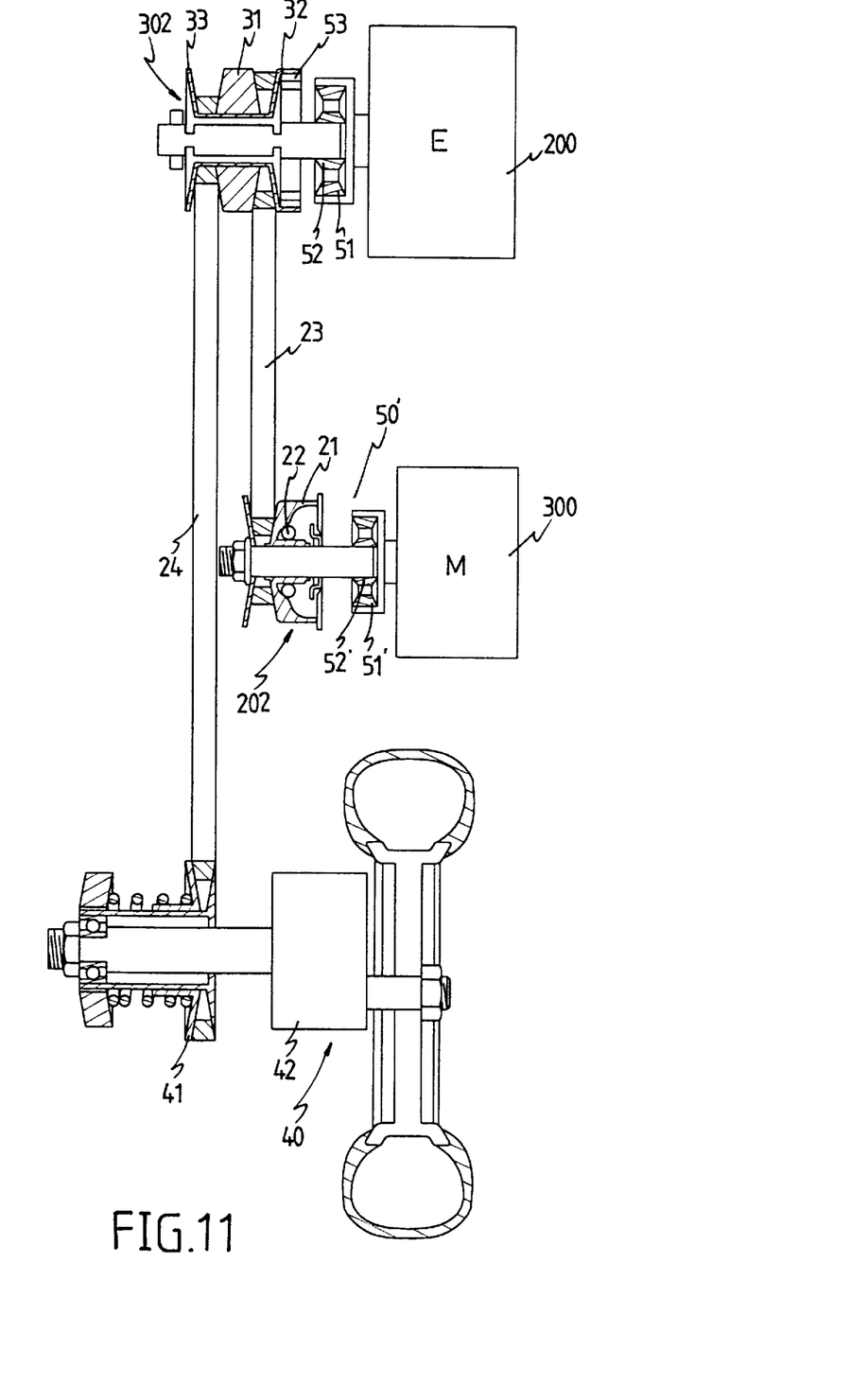
FIG. 11 shows yet another embodiment of the power transmission system.

FIG. 10 shows another embodiment of the system of the present invention, wherein the first pulley means (202) is connected to both of the motor (300) and the engine (200), wherein the engine (200) is connected to the uni-directional means (50) which is connected to the clutch (53), and the motor (300) is connected to another uni-directional means (50) which is connected to the axle (203) of first pulley means (202). The first belt (23) is connected to the first pulley means (202) and the variable pulley means (302), and the second belt (24) is connected between the variable pulley means (302) and the second pulley means (41) which is connected to the gear box (42) and the wheel. FIG. 11 shows yet another embodiment of the power transmission system wherein the engine (200) and the motor (300) in FIG. 4 can be mutually replaced with each other. That is to say, the engine (200) is connected to the variable pulley means (302) and the motor (300) is connected to the first pulley means (202).

Figure 12:
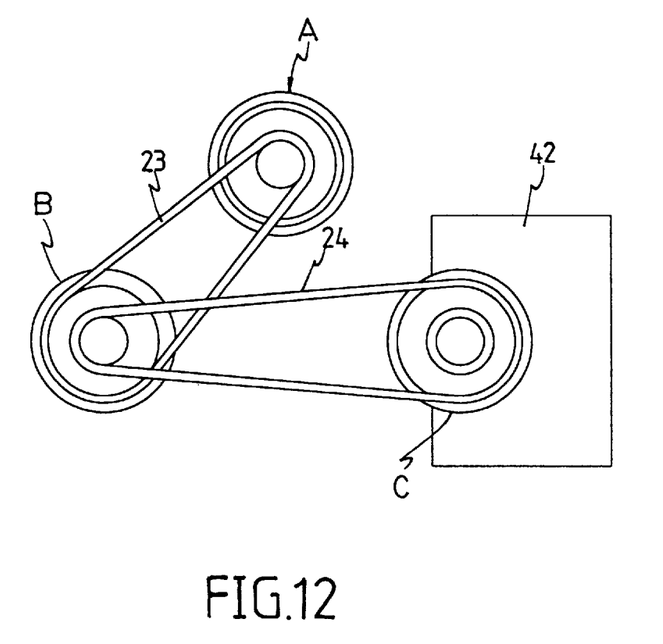
FIG. 12 is a diagram which shows the arrangement of the power transmission system wherein the torque can be provided at a low speed.
Figure 13:
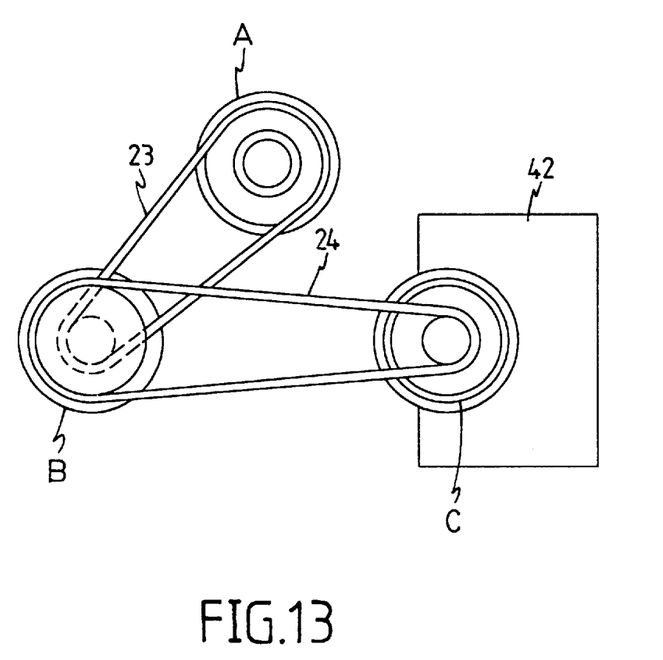
FIG. 13 is a diagram which shows the arrangement of the power transmission system wherein the speed can be increased.

Generally, according to the power transmission system of the present invention, as shown in FIG. 12, the initial output means (A) is connected to the mediated means (B) by the first belt (23), and the mediated means (B) is connected to the final means (C) by the second belt (24) which is connected to the gear box (42). If the smallest effective diameter is a half of the largest effective diameter of each of the three means (A, B and C), then if the r.p.m. of initial means (A) is 10 r.p.m., the r.p.m. of the mediated means (B) is 5 r.p.m. and the r.p.m. of the final means (C) will be 2.5. If the speed reduction ratio of the gear box (42) is 1:10, then the speed at the end of the final means (C) is lowered to be one-fourth of that of the initial means (A). This means the torque at the end of the final means (C) is four times as that of the initial means (A). Similarly, as shown in FIG. 13, if the vehicle moves at a high speed, the r.p.m. of initial means (A) is 10 r.p.m. (the belt 23 is at the largest effective diameter), the r.p.m. of the mediated means (B) is 20 r.p.m. and the r.p.m. of the final means (C) will be 40. If the speed reduction ratio of the gear box (42) is 1:10, then the speed ratio between the initial means (A) and the output of the gear box (42) will be 2.5:1 which is better than the conventional system.

The invention is not limited to the above embodiment but various modification thereof may be made. It will be understood by those skilled in the art that various changes in form and detail may made without departing from the scope and spirit of the present invention.

What is claimed is:

1. A power transmission system comprising:

an engine output device (20) comprising an engine (200) having an output shaft (201) extending therefrom, a first pulley means (202) and a clutch means (53) disengagably connected between said output shaft (201) and said first pulley means (202), a uni-directional means (50) having an outer ring (51) connected to said output shaft (201) and an inner ring (52) connected to said clutch means (53);

a motor output device (30) comprising a motor (300) having an output shaft (301) extending therefrom, a variable pulley means (302) comprising an axle which has a threaded section (34), a movable member (31) movably mounted to said threaded section (34) and having two inclined surfaces, and two disks (32, 33) fixedly connected to said threaded section (34), said movable member (31) located between said two disks (32, 33), a uni-directional means (50') having an outer ring (51') connected to said output shaft (301) and an inner ring (52') connected to said axle of said variable pulley means (302);

a gear shifting device (40) comprising a second pulley means (41) and a gear box (42) which has an input shaft (420) connected to said second pulley means (41) and an output shaft (421) adapted to be connected to a wheel, and a first transmission member (23) connected between said first pulley means (202) and said variable pulley means (302), a second transmission member (24) connected between said second pulley means (41) and said variable pulley means (302), said first transmission member (23) and said second transmission member (24) separated by said movable member (31).

2. The system as claimed in claim 1, wherein each of said first transmission member and said second transmission member is a belt.

3. A power transmission system comprising:

an engine output device (20) comprising an engine (200) having an output shaft (201) extending therefrom, a first pulley means (202) having an axle (203) and a clutch means (53) disengagably connected between said output shaft (201 and said first pulley means (202), a uni-directional means (50) having an outer ring (51) connected to said output shaft (201) and an inner ring (52) connected to said clutch means (53);

a motor output device (30) comprising a motor (300) having an output shaft (301) extending therefrom, a uni-directional means (50') having an outer ring (51') connected to said output shaft (301) and an inner ring (52') connected to said axle (203) of said first pulley means (202);

a gear shifting device (40) comprising a second pulley means (41) and a gear box (42) which has an input shaft (420) connected to said second pulley means (41) and an output shaft (421) adapted to be connected to a wheel, and a variable pulley means (302) comprising an axle which has a threaded section (34), a movable member (31) movably mounted to said threaded section (34) and having two inclined surfaces, and two disks (32, 33) fixedly connected to said threaded section (34), said movable member (31) located between said two disks (32, 33), a first transmission member (23) connected between said first pulley means (202) and said variable pulley means (302), a second transmission member (24) connected between said second pulley means (41) and said variable pulley means (302).

* * * * *